May 30, 1972     E. A. J. MARCATILI     3,666,348

MULTIMODE WAVEGUIDE

Filed Sept. 25, 1970     2 Sheets-Sheet 1

INVENTOR
E. A. J. MARCATILI
BY
ATTORNEY

May 30, 1972  E. A. J. MARCATILI  3,666,348
MULTIMODE WAVEGUIDE

Filed Sept. 25, 1970  2 Sheets-Sheet 2

United States Patent Office 3,666,348
Patented May 30, 1972

3,666,348
MULTIMODE WAVEGUIDE
Enrique Alfredo Jose Marcatili, Rumson, N.J., assignor to Bell Telephone Laboratories, Incorporated, Murray Hill, N.J.
Filed Sept. 25, 1970, Ser. No. 75,616
Int. Cl. G02b 5/14
U.S. Cl. 350—96 WG            11 Claims

ABSTRACT OF THE DISCLOSURE

Dispersion in a multimode waveguide, due to differences in the group velocities of the different modes of wave propagation, is minimized by deliberately introducing coupling means along the guide for strongly coupling between selected pairs of said modes. In guides supportive of modes having only two different group velocities, the coupling, which can be either continuous or at longitudinally spaced intervals along the guide, has a spacial periodicity equal to the beat wavelength between the different modes. In guides supportive of modes having three or more different group velocities, the guide is proportioned such that the average group velocities of selected pairs of guided modes are approximately equal to the same means velocity, and the coupling mechanism has a spacial distribution given by the superposition of sinusoids whose periodicities are equal to the beat wavelengths between the selected pairs of modes.

---

This invention relates to multimode waveguides and, in particular, to optical waveguides.

BACKGROUND OF THE INVENTION

In the transmission of electromagnetic wave energy through a hollow conductive pipe or other type of waveguide, it is well known that the energy can propagate in one or more transmission modes, or characteristic field configurations, depending upon the cross-sectional size and shape of the particular guide, and upon the operating frequency. Typically, at any given frequency, the larger the guide size, the greater are the number of modes in which the energy can propagate. Generally, it is considered desirable to confine propagation to one particular mode chosen because its propagation characteristics are favorable for the particular application involved, and because propagation in more than one mode can give rise to power loss, conversion-reconversion distortion and other deleterious effects.

If the desired mode happens to be the so-called dominant mode, and the wavelength of the wave energy is large enough, it is feasible to restrict the cross-sectional dimensions of the guide so that no modes other than the dominant mode can be sustained therein. This expedient is not applicable, however, if the desired mode is not the dominant mode, or if a guide of larger cross section is prescribed in order to minimize attenuation, or for other reasons. However, because these oversized, or multimode waveguides are inherently capable of supporting more than one propagating mode, they have always been considered to be potentially troublesome. For example, inasmuch as the different modes travel with different group velocities, mode conversion introduces a relative delay in that portion of the signal that is coupled to the slower propagating modes. This is most evident when pulses are transmitted, and results in a broadening of the output pulse by a factor that is proportional to the length of the wavepath.

In the past, every effort has been made to perfect the waveguide and, thereby, to minimize mode conversion. In a paper by H. E. Rowe and W. D. Warters, entitled "Transmission in Multimode Waveguide with Random Imperfections," published in the May 1962 issue of the Bell System Technical Journal, pp. 1031–1170, the effects of random geometric imperfections on the transmission of the $TE°_{01}$ mode wave, propagating in a circular waveguide, are studied and tolerances for these imperfections defined.

Because of the unique field configuration of some modes, it is feasible to tailor the waveguiding structure in a manner to favor a preferred mode. As an example, in the microwave and millimeter wave portions of the frequency spectrum, the circular electric TE modes can be effectively decoupled from the spurious TM modes by the helical waveguiding configuration described in U.S. Pat. No. 2,848,695.

The advent of the laser as a source of coherent radiation at optical wavelengths has substantially magnified the problems of guiding electromagnetic wave energy. Because of the extremely small wavelengths involved, none of the techniques considered above have provided a practical means of obtaining efficient transmission. Instead, new approaches and new techniques have been proposed for dealing with the problems of multimoding, as illustrated by the copending application by E. A. J. Marcatili, Ser. No. 59,014, filed July 28, 1970.

The various approaches to this problem, heretofore considered, have either attempted to restrict propagation to only one mode, or to perfect the waveguide so as to minimize coupling between the preferred mode and the other, spurious modes.

More recently, S. E. Miller and S. D. Personick, in their copending application Ser. No. 75,383, filed Sept. 25, 1970, describe an alternative approach to the wave guidance problem associated with multimode waveguides. In particular, Miller et al. have shown that the effects of dispersion among different modes in a multimode waveguide can be reduced by deliberately enhancing the mode conversion processes in the guide by means of a band-limited random coupling mechanism. To this end, the waveguide cross-sectional dimensions, and axial orientation are randomly modulated to increase mode conversion among all the guided modes.

The broad object of the present invention is to limit the mode conversion processes deliverately introduced into the system between selected pairs of guided modes and, thereby, to simplify the guide structure and to further reduce the dispersion in multimode waveguides.

SUMMARY OF THE INVENTION

In accordance with the present invention, dispersion in a multimode waveguide is minimized by deliverately enhancing the mode conversion processes in the guide between selected pairs of modes. In guides supportive of modes having only two different group velocities, the coupling, which can be either continuous or at longitudinally spaced intervals along the guide, has a spacial periodicity equal to the beat wavelength between the different modes. In guides supportive of modes having three or more different group velocities, the guide is proportioned such that the average group velocities of selected pairs of guided modes are approximately equal to the same mean velocity, and the coupling mechanism has a spacial distribution given by the superposition of sinusoids whose periodicities are equal to the beat wavelengts between the selected pairs of modes.

The effect of the strong intermodal coupling is to cause the wave energy to flow back and forth between these coupled modes, thereby propagating alternately at the higher group velocity and then at the lower group velocity. Since the average velocity for all the pairs of coupled modes is approximately the same, all the energy tends to take the same average time to negotiate the wavepath and, hence, all the energy tends to arrive at the output end of the guide at approximately the same time.

As explained in the copending application by Miller et al., energy can also be coupled to unguided, or radiating modes. Since the latter constitute a loss to the system, this coupling should be minimized. Thus, it is an additional advantage of the present invention that by more precisely limiting the coupling mechanism to between fewer pairs of modes, the tendency to couple energy to an unguided mode is greatly reduced.

These and other objects and advantages, the nature of the present invention, and its various features, will appear more fully upon consideration of the various illustration embodiments now to be described in detail in connection with the accompanying drawings.

DETAILED DESCRIPTION

Figure 1:
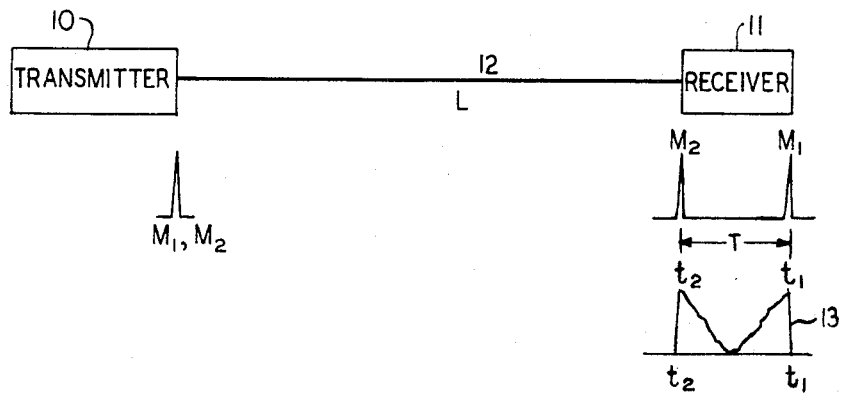
FIG. 1 shows, in block diagram, a long distance multimode communication system, and the effect of mode conversion upon a propagating pulse.
Figure 2:
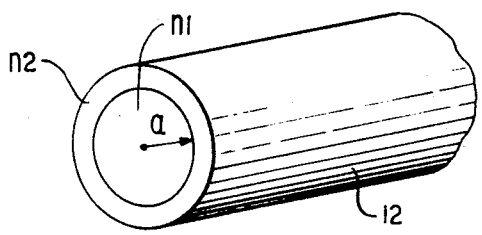
FIG. 2 shows a section of a fiber waveguide.

Referring to the drawings, FIG. 1 shows, in block diagram, a communication system comprising a signal transmitter 10, a receiver 11, and a waveguide 12 connecting the transmitter to the receiver. For purposes of illustration and discussion, an optical communication system is considered, wherein waveguide 12 is a multimode, glass fiber having a circular cylindrical core of refractive index $n_1$, and radius $a$, surrounded by a cladding of refractive index $n_2$. A section of waveguide 12 is illustrated in FIG. 2.

If signal pulses in two different modes $M_1$ and $M_2$ are applied, simultaneously, at the transmitter end of guide 12, as indicated in FIG. 1, the energy in each mode will propagate along the guide independently of the energy in the other mode, and each will arrive at the receive end of the guide at a time determined by its respective group velocity. Propagating at a velocity $v_1$, the pulse in mode $M_1$ will arrive after a time $t_1$ equal to $L/v_1$ while the pulse in mode $M_2$ will arrive after a time $t_2$ equal to $L/v_2$, where $L$ is the guide length. The time difference $T = t_1 - t_2$ is the dispersion. Because any practical guide is not perfect, there will, in fact, be some coupling between the two modes so that energy tends to arrive at the receiver distributed over the entire interval between $t_1$ and $t_2$, producing an output pulse such as is given by curve 13. (It will be noted that curve 13 neglects the effect of dispersion within the individual modes since, in oversize guides and, particularly, in dielectric waveguides, this effect is much smaller than the dispersion among the different guides.)

In a qualitative sense, the above is equally descriptive of what occurs when the waveguide is excited in only one mode, but power is inadvertently fed into additional modes due to mode conversion along the guide. In either situation, the dispersion, due to the different group velocities for the different modes, manifests itself by a broadening of the transmitted pulse an amount which is proportional to the guide length. Recognizing this, the thrust of the prior art has been directed to means for perfecting waveguides so as to minimize mode conversion, and to means for absorbing the energy in the undesired modes so as to minimize the interval over which reconversion could occur.

The present invention is based upon an entirely new insight into the operation of a waveguide. As explained in the copending application by S. E. Miller and S. D. Personick, Ser. No. 75,383, filed Sept. 25, 1970, and assigned to applicant's assignee, a multimode waveguide can be viewed as a multilane highway wherein traffic proceeds along different lanes at different velocities, corresponding to the different group velocities for the several modes. In a prior art waveguide, the energy in each of the different modes tends to remain primarily within one of the lanes (modes) throughout the length of the guide, with an occasional brief excursion (conversion) into one of the other lanes (modes). For the most part, however, the energy in each mode tends to remain in its particular modal configuration and to travel at its particular group velocity, arriving at the output end of the guide at a different time than the energy in the other modes.

By contrast, in the waveguide disclosed by Miller et al. in their above-identified application, there is a deliberate random interchange of lanes, in that the energy in each mode is strongly and deliberately converted to each of the other modes, thereby forcing all of the energy to propagate at all of the different mode velocities. The result is that on the average, all of the energy tends to arrive at the output end of the guide more nearly at the same time.

The present invention produces a similar result, but by somewhat simplified means. Recognizing that the plurality of possible guided modes can be classified according to their group velocities, mode coupling in accordance with the present invention is restricted to between selected groups of modes, rather than among all the guided modes. In guides supportive of modes having only two different group velocities, the coupling, which can be either continuous or at longitudinally spaced intervals along the guide, has a spacial periodicity equal to the beat wavelength between the two different modes. In guides supportive of modes having three or more different group velocities, the guide is proportioned such that the average group velocities of selected pairs of guided modes are approximately equal to the same mean velocity, and the coupling mechanism has a spacial distribution given by the superposition of sinusoids whose periodicities are equal to the beat wavelengths between the selected pairs of modes. This greatly simplifies the guide design, while, in theory, reducing the resulting dispersion, due to the differences in group velocities, to zero.

For the dielectric waveguide shown in FIG. 2, the modes can be classified by group velocities as shown in Table I.

TABLE I

| Group | number | | | | |
|---|---|---|---|---|---|
| | 1 | 2 | 3 | 4 | 5 |
| Group velocity | $v_1$ | $v_2$ | $v_3$ | $v_4$ | $v_5$ |
| Mode designations | HE$_{11}$ | HE$_{21}$ | HE$_{31}$ | HE$_{41}$ | TE$_{02}$ |
| | | TM$_{01}$ | EH$_{11}$ | EH$_{21}$ | TM$_{02}$ |
| | | TE$_{01}$ | HE$_{13}$ | | HE$_{22}$ |

Thus, whereas the waveguide 12 may be supportive of as many as twelve different modes, only five different group velocities need be taken into account. As an example, however, let us first consider the case where guide 12 is supportive of only the modes in groups 1 and 2. In this situation, strong intermodal coupling, having a spacial periodicity given by $$\lambda_m = \frac{2\pi}{\beta_2 - \beta_1} \quad (1)$$

is introduced along the guide, where $\beta_2$ and $\beta_1$ are the phase constants for the modes in the respective groups. The effect of this is to couple the energy back and forth between the two modes so that, on the average, all the energy arrives at the output end at a time equivalent to the average of the two group velocities $v_1$ and $v_2$. In accordance with the present invention, the dispersion due to the difference in group velocities can be completely eliminated.

Figure 3:
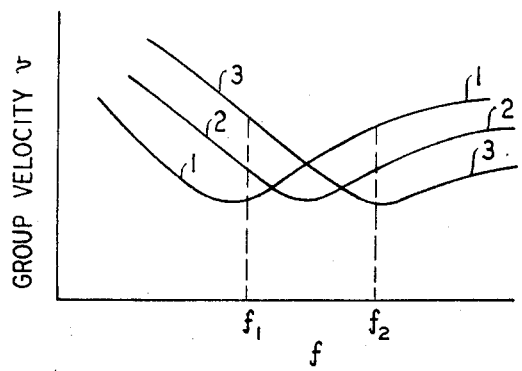
FIG. 3 shows the variation of group velocity as a function of frequency for three different groups of modes.

In a guide supportive of three or more groups of modes, an additional adjustment in the waveguide is required. To illustrate, the case wherein the guide is supportive of mode groups 1, 2 and 3, having group velocities $v_1$, $v_2$ and $v_3$ is now considered. In this regard, FIG. 3 shows the variation of group velocity as a function of frequency for the modes in these three groups. As can be seen, below frequency $f_1$ and above frequency $f_2$, the group velocity of the group 2 modes is intermediate the group velocities of the group 1 and group 3 modes. Accordingly, the waveguide is dimensioned such that the average of the largest and the smallest group velocities is equal to some intermediate group velocity, $v_m$. That is $$\frac{v_1 + v_3}{2} = v_m \qquad (2)$$

In this illustrative embodiment, $v_m$ is made as close to $v_2$ as is practical. So dimensioned, mode conversion is then introduced only between the modes of groups 1 and 3.

Thus, referring again to FIG. 1, waveguide 12 is designed to have the group velocities for the various modes related in accordance with Equation 2, and to have strong intermodal coupling only between the modes of groups 1 and 3. As indicated hereinabove, this coupling can be continuous, or at spaced intervals along the guide. So designed, wave energy introduced at the input end will propagate along guide 12 distributed primarily among modes $HE_{11}$, $HE_{31}$, $EH_{11}$ and $HE_{13}$ of groups 1 and 3. On the average, the energy, thus distributed, will arrive at the output of guide 12 at the same time as the energy that may have been inadvertently coupled between these modes and modes $HE_{21}$, $TM_{01}$ and $TE_{01}$ of group 2. Thus, once again, all of the energy tends to arrive at the output end of guide 12 at approximately the same time.

If, for example, the guide supports an even number of groups of modes, such as four, the guide is proportioned such that the average velocity of the fastest group and the slowest group, and the average velocity of the next-to-the-fastest group and the next-to-the-slowest group, etc., are as equal to some common velocity, $v_m$, as is practical. That is $$\frac{v_1 + v_4}{2} \approx \frac{v_2 + v_3}{2} \approx v_m \qquad (3)$$

where the approximation is such as to produce an improvement of at least one order of magnitude.

It will be noted that in the case of an even number of groups of modes, the common average group velocity, $v_m$, does not correspond to the group velocity of any particular modes.

Figure 4:
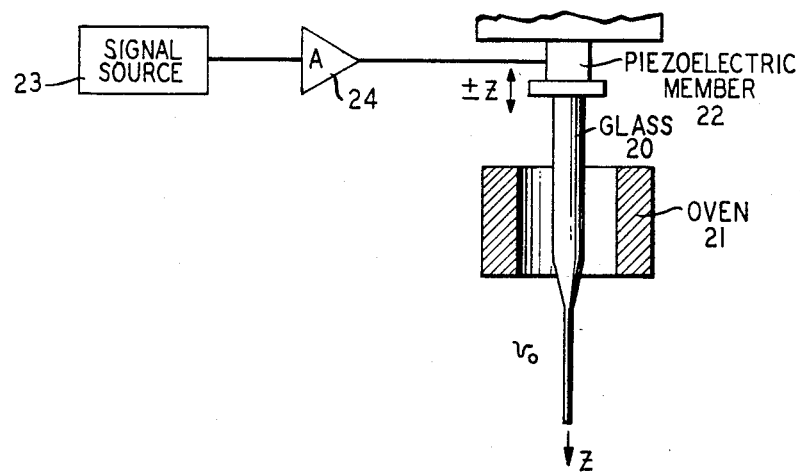
FIGS. 4 and 5 show arrangements for producing diameter changes and axial directional changes in a glass fiber waveguide.

FIG. 4 shows an arrangement for fabricating a glass fiber waveguide for guiding optical wave energy. Typically, such fibers are drawn from a preform material by heating the glass in an oven and then pulling on it. Thus in FIG. 4, a piece of glass 20 extends into an oven 21 and is drawn down at a velocity $v_0$. Since the diameter of the drawn fiber is a function of the velocity at which it is drawn, the velocity, in accordance with the prior art, is carefully controlled in order to obtain a uniform fiber. This uniformity has always been considered to be important since it was also known that variations in the fiber diameter induce mode coupling. By contrast, in accordance with the present invention, the velocity at which the glass is drawn is deliberately modulated so as to create diameter changes and, thereby, to enhance this coupling. Thus, in FIG. 4, the glass is supported by a piezoelectric member 22 which is energized by a signal derived from a signal source 23. The frequency of the modulating signal, as will be explained in greater detail hereinbelow, is related to the beat wavelength of the modes to be coupled. An amplifier 24 may be included to provide additional drive, if required.

In operation, the piezoelectric member produces an axial displacement $\pm \Delta z$ of glass 20 in response to the signal derived from source 23. This displacement produces a change in the drawing velocity which, in turn, modulates the fiber diameter.

Figure 5:
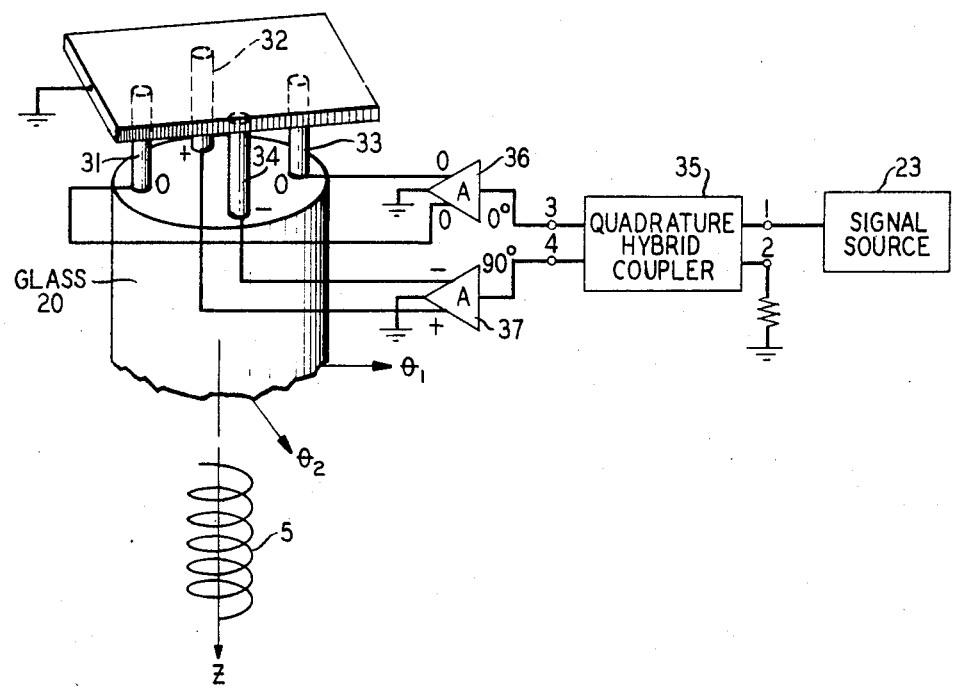

The modal configurations of the guided waves can, generally, be divided into two classes. The first class is characterized by electromagnetic field configurations that are symmetric about a plane containing the axis of the guide, as typified by the modes in mode groups 1, 3, 5. . . . The second class is characterized by a lack of such symmetry, as typified by the modes in groups 2, 4, 6. . . . While changes in the diameter of the fiber enhances the coupling among the modes in the respective classes, it does not provide coupling between the two dissimilar classes of modes. The latter is effectuated by changes in the direction of the guide axis. For example, in a system supportive of wave energy polarized only along one direction, a ripple is induced in the wave-guiding structure in the plane of the guide perpendicular to the direction of polarization. In a circular symmetrical guide, supportive of wave energy polarized along mutually perpendicular directions, ripples are induced in two mutually perpendicular directions, resulting in a helical waveguiding configuration. These directional changes are produced by a modification of the pulling structure of FIG. 4, such as is illustrated in FIG. 5. In this pulling arrangement the piezoelectric member 22 of FIG. 4 is replaced by four piezoelectric rods 31, 32, 33 and 34, symmetrically disposed about the longitudinal axis of the glass rod 20. Diametrically opposite rods are energized 180 degrees out of phase, and each pair of diametrically opposite rods is energized 90 degrees out of phase relative to the other pair. To generate these signals, the signal derived from signal source 23 is coupled to port 1 of a quadrature hybrid coupler 35 which divides it into two equal components in output ports 3 and 4. As is charecteristic of a quadrature coupler, the two output signals are, in addition, 90 degrees out of phase relative to each other.

Each of the two output signals, derived from ports 3 and 4, is coupled respectively to a different amplifier 36 and 37. The amplifiers, in addition to amplifying the signals, converts them to a pair of balanced signals which are used to energize diametrically opposite pairs of rods. Thus, the output signals from amplifier 36 are coupled to rods 31 and 33, while the output signals from amplifier 37 are coupled to rods 32 and 34.

While the total effect upon the glass pulling operation is a superposition of the effects produced by all the different frequency signal components derived from source 23, for purposes of explanation, the action of only one frequency component will be considered. In particular, the instant at which the signal component at amplifier 36 is zero is illustrated in FIG. 5. Simultaneously, the signal at amplifier 37 is a maximum, with a positive polarity signal applied across rod 32 and a negative polarity signal applied across rod 34. The effect produced thereby is to induce an angular displacement of the glass axis by an amount $\theta_2$, in the plane of the rods. A quarter of a cycle later, the signal at amplifier 37 is zero while the signal at amplifier 36 is a maximum, producing an angular displacement $\theta_1$ in the plane of rods 31 and 33. This process continues, producing a deflection $-\theta_2$ the next quarter cycle and a deflection $-\theta_1$ a quarter cycle thereafter. The overall effect is to generate a helical motion as the glass is drawn, as indicated by curve 5 in FIG. 5. To induce both changes in diameter as well as changes in the direction of the guide axis, a common signal can be superimposed upon the four rods, or a separate piezoelectric member, separately excited, can be employed. With either arrangement, the modes within each of the two classes of modes are coupled among themselves as a result of the diameter changes, while interclass coupling is produced by changes in the direction of the fiber axis.

In the coupling arrangements disclosed in the above-identified application by Miller and Personick, the guide was designed to couple randomly among all the guided modes. Since strong coupling will only occur between modes whose beat wavelengths, $\lambda_b$, approximate the spacial periodicity, $\lambda_m$, of the coupling mechanism, the spacial periodicity along the waveguide was a random superposition of the beat wavelengths between all the possible combinations of pairs of modes having different phase constants. Thus, as taught by Miller et al. to couple among the three groups of modes herein considered, the spacial distribution of the coupling mechanism would be given approximately (i.e., ±10 percent) by the random superposition of beat wavelengths $$\lambda_{12} = \frac{2\pi}{\beta_1 - \beta_2}$$

$$\lambda_{13} = \frac{2\pi}{\beta_1 - \beta_3}$$

and $$\lambda_{23} = \frac{2\pi}{\beta_2 - \beta_3} \qquad (4)$$

where $\beta_1$, $\beta_2$ and $\beta_3$ are the phase constants of the modes in groups 1, 2 and 3, respectively. By contrast, in accordance with the present invention, the coupling is limited to between selected groups of modes and, in particular, for the illustrative embodiment having three groups, between mode groups 1 and 3. In addition, the coupling mechanism is not random, but rather has a single wavelength $$\lambda_{13} = \frac{2\pi}{\beta_1 - \beta_3} \qquad (5)$$

Thus, source 23 is a single frequency signal source.

EXAMPLE

As indicated hereinabove, the diameter of the drawn fiber is related to the pulling velocity. More particularly, the relationship between diameter and velocity is given by $$\frac{d_2}{d_1} = \left(\frac{v_1}{v_2}\right)^n \qquad (6)$$

where $n$ is approximately equal to ½. Substituting this value for $n$ in Equation 6 gives $$\frac{d_2}{d_1} = \left(\frac{v_1}{v_2}\right)^{1/2} \qquad (7)$$

The instantaneous displacement, $z$, produced by the piezoelectric member, at a frequency $\omega$ is $$z = z_p \sin \omega t \qquad (8)$$

where $z_p$ is the peak displacement, which varies as a function of the amplitude of the electrical excitation.

The incremental velocity $v_m$ superimposed on the fiber is given by the time derivative of the displacement, or $$v_m = \frac{dz}{dt} = z_p \omega \cos \omega t = v_{mp} \cos \omega t \qquad (9)$$

The instantaneous fiber drawing velocity is then given by $$v = v_0 + v_m \qquad (10)$$

where $v_0$ is the average pulling velocity.

For an increase in diameter $2a$ in a fiber having an average diameter $2d$, the ratio of the peak velocity to the average velocity is $$\frac{v_0 + v_{mp}}{v_0} = \left(\frac{d+a}{d}\right)^2 \approx 1 + \frac{2a}{d} \qquad (11)$$

for $$\frac{a}{d} \ll 1$$

From Equation 9, we derive $$v_{mp} = \frac{2a}{d} v_0 \qquad (12)$$

Substituting for $v_{mp}$ from Equation 12, and solving for $z_p$, we obtain $$z_p = 2 \frac{a}{d} \cdot \frac{v_0}{\omega} = \frac{1}{\pi} \frac{a}{d} \cdot \lambda_m \qquad (13)$$

where $$\lambda_m = \frac{v_0}{f}$$

is the mechanical or spacial wavelength of the diameter change along the fiber introduced by the electrical drive signal of frequency $f$.

Thus, knowing both the desired beat wavelength, $\lambda_b$, from Equation 5, and the average drawing velocity, $v_0$, the spacial wavelengths, $\lambda_m$, of the diameter changes and the drive signal frequencies are defined.

As a numerical example, we assume a fiber having a diameter $2d = 6$ μm., being drawn at average rate of 2 ft./sec. or 0.61 m./sec. Using Table I on page 3203 of the article by D. Marcuse entitled "Mode Conversion Caused by Surface Imperfections of a Dielectric Slab Waveguide," published in the December 1969 issue of the Bell System Technical Journal, we find that we can obtain one hundred percent coupling between modes with a coupling length D equal to 30,000 μm. for a change in fiber radius $a$ when $$a = \frac{40 \cdot (3)^2}{30,000} = 0.012 \text{ μm.}$$

The constant 40 used above is an approximation of the values given in the column headed $ad/d^2$ in Table I of the above-identified article for a refractive index difference between the fiber core its cladding of 1 percent; i.e., $n_g = 1.01$.

For any particular beat wavelength $\lambda_b$, which is a function of the signal frequency and the fiber diameter, the longitudinal displaced $z_p$ that must be produced can now be computed using Equation 13. From the relationship $$f = \frac{v_0}{\lambda_m} \qquad (14)$$

we can also compute the optimum frequency of the drive signal. Assuming a beat wavelength of 200 μm., the drive signal frequency is approximately 3000 hertz. Amplifier 24 delivers enough voltage to piezoelectric member 22 to produce a peak-to-peak longitudinal displacement of ±0.25 μm.

An indication of the reduction in dispersion that can be obtained in a waveguide designed in accordance with the present invention, can be obtained by reference to Table II which is a tabulation of the parameters R and $p_i^2$ for a circular, cylindrical waveguide of the type shown in FIG. 2, where R is proportional to the core radius $a$, and $p_i^2$ is linearly related to the group velocity, $v_1$. Specifically, $$R = \left(\frac{2\pi a}{\lambda}\right)(n_1^2 - n_2^2)^{1/2} \qquad (15)$$

and $$v_i \approx C\left[1 - \frac{1}{2}\left(\frac{\lambda p_i}{2\pi a n_1}\right)^2\right] \qquad (16)$$

where is the free-space wavelength at the signal frequency. (See "Electromagnetic Waves" by S. A. Schelkunoff, D. Van Nostrand Company, Inc., 1943, pp. 425–428).

TABLE II

| R | $p_1^2$ | $p_3^2$ | $p_1^2 + p_3^2/2$ | $p_i^2$ |
|---|---|---|---|---|
| 3.86 | 3.59 | 14.7 | 9.15 | 8.8 |
| 3.99 | 3.65 | 15.9 | 9.17 | 9 |
| 5.32 | 4.07 | 20.3 | 12.2 | 10.2 |
| 6.65 | 4.38 | 22.4 | 13.35 | 11 |

From Table II it is seen that in a waveguide in accordance with the prior art, inadvertent mode conversion would produce dispersion that is proportional to $p_3^2 - p_1^2$. For the range of core radii given, this difference varies from a maximum of about 18 to a minimum of about 11.

For a waveguide designed in accordance with the present invention, the dispersion is proportional to the difference between the average velocity, which is proportional to $p_3^2+p_1^2/2$, and the mean velocity, which is proportional to $p_2^2$. Over the same range of radii, this difference varies from a maximum of 2.35 to a minimum of 0.35. The latter value represents a 50 fold improvement over the prior art.

While the invention has been described in connection with glass fibers for guiding optical waves, the principles of the invention are equally applicable in connection with millimeter and microwave guidance systems. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A waveguide capable of guiding wave energy at the frequency of interest in two groups of modes having different propagation velocities including:
   coupling means comprising changes in the parameters of said waveguide having a sinusoidal spacial distribution, disposed therealong for enhancing the successive coupling of said wave energy back and forth between said two groups of modes thereby reducing the dispersion due to the difference in said propagation velocities.

2. The waveguide according to claim 1 wherein the spacial periodicity of said sinusoidal distribution is given by $$\lambda_m = \frac{2\pi}{\beta_2 - \beta_1}$$

where $\beta_2$ and $\beta_1$ are the phase constants of said modes of different velocities.

3. The waveguide according to claim 1 wherein said coupling means is continuous along said waveguide.

4. The waveguide according to claim 1 wherein said coupling means is located at longitudinally spaced intervals along said waveguide.

5. A waveguide capable of guiding wave energy at the frequency of interest in a pluarlity of different modes of propagation having different group velocities; characterized in that:
said guide is dimensioned such that the average group velocity of different selected pairs of said modes is approximately equal to a common mean velocity;
and in that coupling means are provided along said guide for enhancing the coupling between said different selected pairs of modes.

6. The waveguide according to claim 5 adapted to guide optical wave energy.

7. The waveguide according to claim 5 wherein said means includes changes in the diameter of said waveguide.

8. The waveguide according to claim 5 wherein said means includes changes in the direction of the guide axis.

9. The waveguide according to claim 5 wherein said coupling means has a spacial distribution along said guide given by the superposition of sinusoids whose periodicities are defined by the beat wavelengths between said selected pairs of modes.

10. The waveguide according to claim 5 wherein said plurality of modes have three different group velocities $v_1$, $v_2$ and $v_3$;
and wherein said guide is proportioned such that $$v_1 + v_3/2$$

is approximately equal to $v_2$.

11. The waveguide according to claim 5 wherein said plurality of modes have four different group velocities $v_1$, $v_2$, $v_3$ and $v_4$;
and wherein said guide is proportioned such that $$\frac{v_1+v_4}{2} \approx \frac{v_2+v_3}{2} \approx v_m$$

where $v_m$ is a common mean velocity.

References Cited
UNITED STATES PATENTS

| | | | |
|---|---|---|---|
| 2,904,759 | 9/1959 | Morgan | 350—96 WG UX |
| 3,529,205 | 9/1970 | Miller | 350—96 WG X |

OTHER REFERENCES

Marcuse et al.: "Mode Conversion Caused by Diameter Changes of a Round Dielectric Waveguide," The Bell System Technical Journal, vol. 48, No. 10, December 1969, pp. 3217–3232.

JOHN K. CORBIN, Primary Examiner

U.S. Cl. X.R.

65—3, 12, 87, 108, 276, 302, DIG 7